Oct. 27, 1970  W. D. MILLER ET AL  3,536,873
FLOW SWITCH
Filed Aug. 26, 1968

INVENTORS
WILLIS D. MILLER
JAMES P. WELSH

BY
Fryer, Tjensvold, Feix, Phillips & Lempio
ATTORNEYS

United States Patent Office 3,536,873
Patented Oct. 27, 1970

3,536,873
FLOW SWITCH
Willis D. Miller, Peoria Heights, and James P. Welsh, Morton, Ill., assignors to Caterpillar Tractor Co., Peoria, Ill., a corporation of California
Filed Aug. 26, 1968, Ser. No. 755,066
Int. Cl. H01h 35/40
U.S. Cl. 200—81.9
2 Claims

ABSTRACT OF THE DISCLOSURE

A flow switch, responsive to variation of fluid flow in a conduit, having an elongated member penetrating the conduit and responsive to fluid flow variation to make or break electrical engagement with an electrical contact. A resilient diaphragm is effectively interconnected between the conduit and the elongated member to seal off the conduit adjacent the elongated member and also to resist movement of the elongated member in response to fluid flow variation. The resilient diaphragm is preferably composed of an electrically conductive metal for association into a suitable warning circuit.

---

The present invention relates to a fluid flow switch and more particularly to a switch which is adaptable to monitor the flow of coolant in an engine for providing a warning signal upon unacceptable reduction of coolant flow through the engine. The flow switch is of extremely simple and reliable construction having an elongated member penetrating the fluid conduit and responsive to fluid flow variation for affecting electrical make or break engagement with a suitable electrical contact. A resilient diaphragm is effective to both seal off the conduit adjacent the penetrating member as well as to resist movement of the elongated member in response to fluid flow variation.

Failure of the coolant system in an engine may cause considerable damage to the engine by overheating particularly when the engine is of a high output type. Temperature gauges are effective to indicate the degree of overheating. However the delay arising because the heat gauge is responsive to overheating and not to failure in the coolant system, damage may occur in the engine before the operator is aware of the problem. Accordingly, it is desirable to provide means for warning the operator of an unacceptable reduction of coolant flow during engine operation. Since considerable damage may result to the engine from failure of this warning system, it is important that it be reliable over extended periods of engine operation. Since the flow switch must necessarily penetrate into a coolant conduit for the engine, the conduit adjacent the flow switch must be sealed or closed to prevent loss of fluid from the coolant system and additionally to protect certain portions of the flow switch from the coolant fluid.

The present invention provides a particularly simple and reliable flow switch for achieving the objects and advantages referred to above. The manner in which the invention achieves these objects is set forth by way of example in the following description which also makes apparent additional advantages and objects of the invention.

In the drawings referenced by the description:

Figure 1:
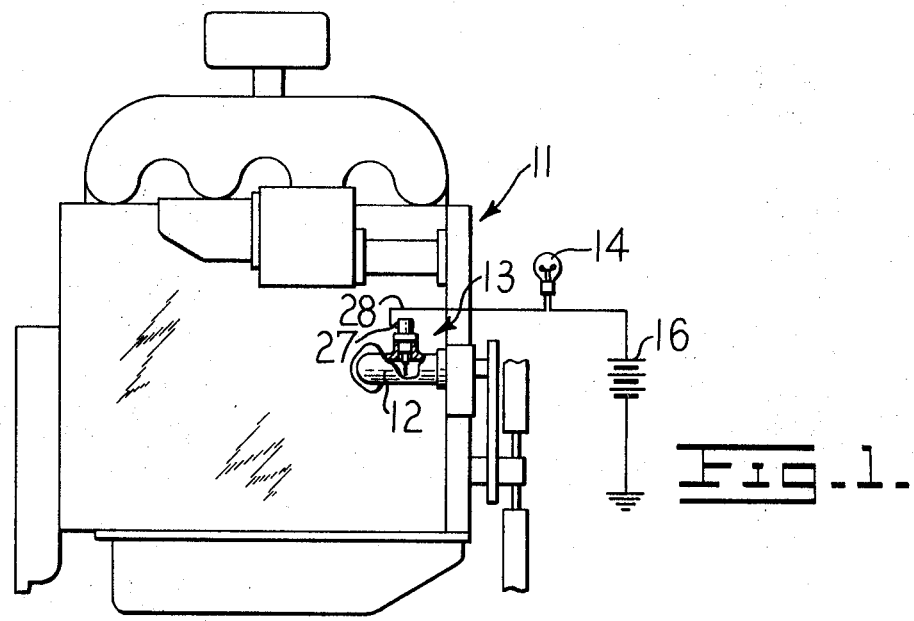
FIG. 1 is a generally schematic view of an engine with the present flow switch associated with one of its coolant conduits.

An engine 11 is illustrated in FIG. 1 having a conduit 12 through which fluid is circulated during operation of the engine for cooling of the engine. To provide a warning in case of a coolant system failure which terminates or unacceptable reduces the flow of coolant through the engine, a flow switch 13 is associated with the fluid conduit 12 and with a suitable warning circuit represented by the signal lamp 14 and the electrical source 16. To complete the electrical circuit between the flow switch 13, the lamp 14 and the source 16, the flow switch is also in electrical communication with the engine 11 which serves as a ground connection for the circuit.

Figure 3:
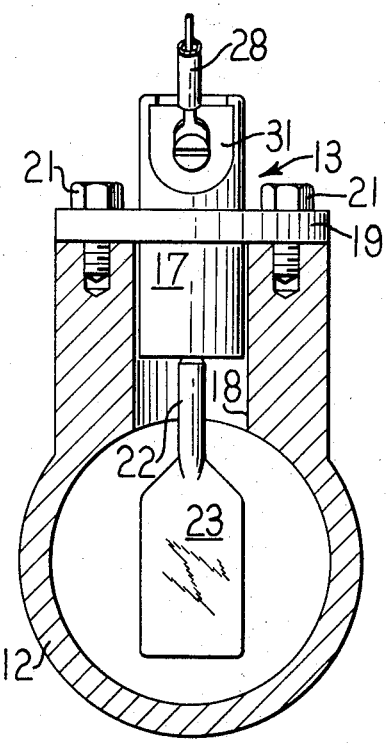
FIG. 3 is a view taken along an axis of the conduit with the conduit being in section to illustrate placement of the flow switch.
Figure 2:
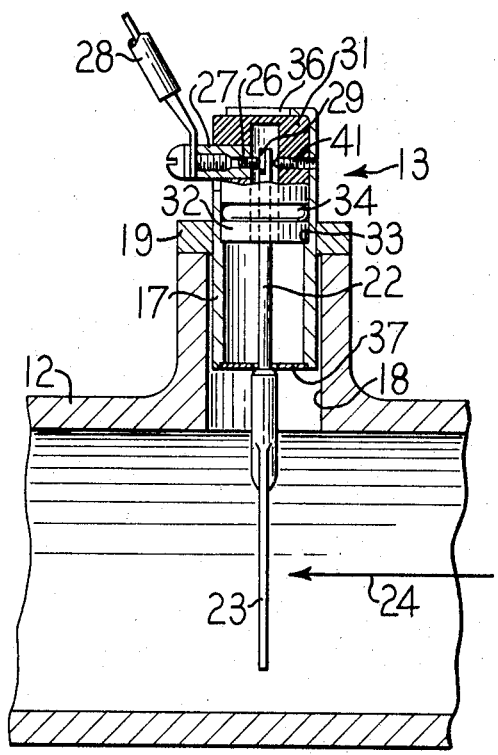
FIG. 2 is an enlarged view, with parts in section, of the flow switch and coolant conduit of FIG. 1.

Construction of the flow switch 13 is illustrated in FIGS. 2 and 3. Although the flow switch 13, as described below, may be simplified by greater integration with the conduit 12, the flow switch 13 is preferably a self-contained unit so that it may be adapted to existing coolant systems or rapidly replaced when desired. The flow switch 13 comprises a tubular body 17 which is inserted into an opening 18 in the conduit 12 and secured in place by means of a flange 19 and cap screws 21 (see FIG. 3). The flange 19 is sealed with respect to the switch body 17 and with respect to the conduit 12 by conventional means such as sealing rings (not shown).

An elongated member 22 is contained within the tubular body 17 and penetrates into the fluid passage defined by the conduit 12 to have a flat paddle portion 23 presented to fluid flow, indicated at 24, within the conduit 12. The elongated member 22 is responsive to fluid flow variation within the conduit 12 to make or break electrical engagement with an electrical contact 26. The electrical contact 26 is supported by a conductive adapter 27 which is in communication with the signal lamp 14 (see FIG. 1) by means of an electrical line 28. The elongated member 22 is mounted with an electrical point 29 at its upper end to assure positive make or break engagement with the electrical contact 26. Since the tubular switch body 17 is electrically conductive to permit communication between the switch and the conduit 12, the electrical contact adapter 27 is supported within the switch body by an insulating member 31 which may be of a suitable material such as an elastomer. The insulating body 31 is supported by a washer 32 resting upon a shoulder 33 of the tubular body 17 and a seal ring 34. The insulating member 31 is secured in place by a crimped portion 36 of the tubular body 17.

A resilient diaphragm 37 (see FIG. 2) is secured between the base of the tubular body 17 and the elongated member 22 to serve at least two important functions. It serves as a seal between the interior of the conduit 12 and the interior of the switch body 17 to prevent loss of cooling fluid or damage to the various switch portions by the cooling fluid. It additionally serves to resiliently locate the elongated member 22 and to resist movement of the member in response to fluid flow variations in the conduit 12. To serve these two functions, the diaphragm 37 could be composed of a material such as an elastomer with the elongated member 22 being pivotally supported for example by the washer 32 which would also serve to provide electrical communication between the elongated member 22, its electrical point 29 and the switch body 17. However, to simplify design of the switch, the resilient diaphragm 37 is constructed of electrically conductive material, preferably a metal having suitable resilience characteristics such as a beryllium-copper alloy. In this manner, the diaphragm 37 serves the additional function of providing a pivot axis for the elongated member 22 as well as providing electrical communication between the elongated member 22, its electrical point 29 and the switch body 17.

In operation, the resilient diaphragm 37 tends to position the elongated member with its electrical point 29 in engagement with the electrical contact 26, as shown in FIG. 2, in the absence of substantial fluid flow through the conduit 12. Thus the circuit through the warning lamp 14 (see FIG. 1) is closed during startup of the engine to determine if the lamp 14 is in proper working order. As the engine is set into operation and cooling fluid commences to circulate through the engine and the conduit 12, as indicated by the arrow 24, it acts against the paddle portion 23 of the elongated member 22 and moves the electrical point 29 out of engagement with the contact 26. This breaks the circuit with the warning lamp 14 so that the lamp is normally not actuated during engine operation. As the elongated member 22 is rotated by fluid flow through the conduit 12, it creates stress in the resilient diaphragm 37. Accordingly, upon termination or unacceptable reduction of the fluid flow rate in conduit 12 due, for example, to a coolant system failure, the resilient diaphragm 37 tends to reposition the elongated member 22 so that its point 29 engages the electrical contact 26 and actuates the warning lamp of FIG. 1 to provide a signal to the operator. A set screw 41 is positioned within the insulating member 31 to limit motion of the member 22 in response to fluid flow through the conduit 12 and to prevent excessive flexure and possible damage in the resilient diaphragm 37. The set screw 41 may be initially adjusted and then sealed in place during the operating life of the switch.

What is claimed is:

1. A flow switch for providing an electrical signal in response to fluid flow variations in a passage formed by a conduit, comprising an electrically conductive, tubular body slidably arranged in an opening in the conduit, said body having collar means securing said body to the conduit in a selected angular position relative to the axis of said body and providing a fluid seal between said body and the conduit, an elongated, electrically conductive member arranged coaxially within said body and generally perpendicular to a flow path in the conduit, a paddle secured in fixed relation to one end of the member penetrating the conduit with said paddle transverse to the flow path in the conduit, an electrical contact arranged on said body adjacent an end of said member disposed within said body, said electrical contact and the adjacent end of said member being arranged in parallel relation to the flow path in the conduit, means for communicating said electrical contact and said body with a warning circuit, an electrically conductive, resilient diaphragm interconnecting a midportion of said member and said body, to form a pivot axis for said member, said diaphragm providing a seal between said member and said body and tending to resist pivotal motion of said member, means for electrically insulating said member from said body, and stop means arranged on an opposite surface of said body from said electrical contact, said stop means being effective to limit pivotal motion of said member away from said electrical contact and prevent excessive flexure of said diaphragm.

2. The invention of claim 1 wherein the electrical point of the member is normally urged into engagement with the electrical contact by the resilient diaphragm, normal fluid flow in the conduit being sufficient to overcome the resilient diaphragm and pivot the member for disengaging the electrical point from the contact.

References Cited

UNITED STATES PATENTS

| | | | |
|---|---|---|---|
| 2,238,327 | 4/1941 | Jackson et al. | 200—81.9 |
| 2,513,863 | 7/1950 | Havens | 200—81.9 |
| 2,952,753 | 9/1960 | Kmiecik et al. | 200—81.9 |
| 3,148,254 | 9/1964 | Clason | 200—81.9 |
| 3,369,089 | 2/1968 | Hellman | 200—81.9 |
| 3,119,979 | 1/1964 | Martin | 200—81.9 XR |

ROBERT K. SCHAEFER, Primary Examiner

J. R. SCOTT, Assistant Examiner